United States Patent
Martinez

(10) Patent No.: US 11,641,943 B2
(45) Date of Patent: May 9, 2023

(54) CABINET-PROTECTING WATERPROOF MAT

(71) Applicant: Jesus Martinez, San Antonio, TX (US)

(72) Inventor: Jesus Martinez, San Antonio, TX (US)

(*) Notice: Subject to any disclaimer, the term of this patent is extended or adjusted under 35 U.S.C. 154(b) by 190 days.

(21) Appl. No.: 16/950,788

(22) Filed: Nov. 17, 2020

(65) Prior Publication Data
US 2022/0151386 A1     May 19, 2022

(51) Int. Cl.
*B32B 3/00*     (2006.01)
*A47B 97/00*     (2006.01)
*B32B 25/04*     (2006.01)

(52) U.S. Cl.
CPC .............. *A47B 97/00* (2013.01); *B32B 25/04* (2013.01); *B32B 2307/7145* (2013.01); *B32B 2307/726* (2013.01); *B32B 2307/7265* (2013.01); *B32B 2307/744* (2013.01); *B32B 2571/00* (2013.01)

(58) Field of Classification Search
CPC ................................. B32B 25/04; G08B 19/00
See application file for complete search history.

(56) References Cited

U.S. PATENT DOCUMENTS

| | | | |
|---|---|---|---|
| 7,142,123 B1* | 11/2006 | Kates | G01N 27/048 340/602 |
| 2008/0055112 A1* | 3/2008 | McGinty | A47L 15/4212 340/870.16 |
| 2014/0256533 A1* | 9/2014 | Woytowich | B01J 20/26 502/402 |

FOREIGN PATENT DOCUMENTS

JP     2008295626 A    * 12/2008

* cited by examiner

*Primary Examiner* — Elizabeth E Mulvaney
(74) *Attorney, Agent, or Firm* — Lyman Moulton, Esq.; Moulton Patents, PLLC

(57) ABSTRACT

The cabinet-protecting waterproof mat is specifically designed to prevent water damage for sink base cabinets and to alert the owner when there is water leakage. The main mat is waterproof, mildew resistant, and catches water that may have dripped or leaked on the main pad, surrounded by an elevated lip. The mat has a battery-powered sensor to detect when water is collecting on the mat. Furthermore, the sensor is connected to a speaker to emit beeping noises when water is detected or if the battery needs replacing. The volume of said beeping can be set to high or low, and the power can be turned on or off by corresponding buttons.

18 Claims, 6 Drawing Sheets

CABINET-PROTECTING WATERPROOF MAT

BACKGROUND

Water damage describes various possible losses caused by water intruding where it will enable attack of a material or system by destructive processes such as rotting of wood, mold growth, bacteria growth, rusting of steel, swelling of composite woods, de-laminating of materials such as plywood, and many others. The damage may be imperceptibly slow and minor such as water spots that could eventually mar a surface, or it may be instantaneous and catastrophic such as burst pipes and flooding. However fast it occurs, water damage is a major contributor to loss of property. There have been no products available as original equipment or as an aftermarket to address this problem.

Water damage is not uncommon in an under sink cabinet. Not only does water stain wood, but it also sometimes leaves behind toxic mold and mildew that needs to be removed promptly. There have been no products available as original equipment or as an aftermarket to address this problem either.

There exists a need for a cabinet-protecting waterproof mat that is not being met by any known or disclosed device or system of present.

SUMMARY OF THE INVENTION

The cabinet-protecting waterproof mat is specifically designed to prevent water damage for sink base cabinets and to alert the owner when there is water leakage. The main mat is waterproof, mildew resistant, and catches water that may have dripped or leaked on the main pad, surrounded by an elevated lip. The mat has a battery-powered sensor to detect when water is collecting on the mat. Furthermore, the sensor is connected to a speaker to emit beeping noises when water is detected or if the battery needs replacing. The volume of said beeping can be set to high or low, and the power can be turned on or off by corresponding buttons.

Figure 1:
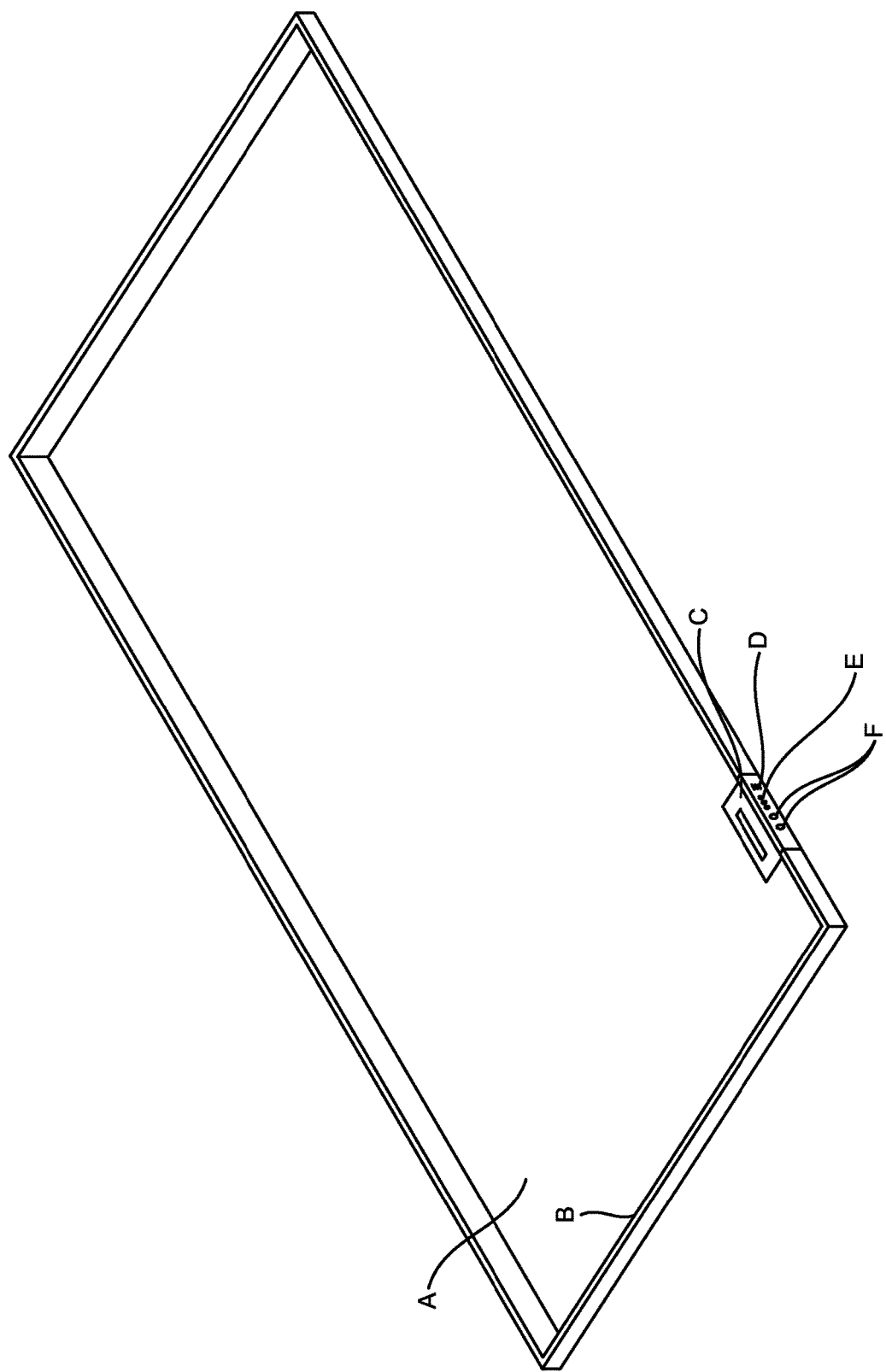
FIG. 1 is a view of the cabinet-protecting waterproof mat in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure the term [term] is used to refer to [describe, rest of sentence]. The term [term] refers to [describe, rest of sentence].

FIG. 1 is a view of the cabinet-protecting waterproof mat in accordance with an embodiment of the present disclosure. The main mat surface A is a waterproof, mildew resistant, flex rubber mat that comes in a variety of colors and sizes. Surrounding this main surface on the edge of the mat is a 1 inch high lip B made of flexible and sturdy synthetic material. This lip prevents water from the main mat surface from running off the mat, potentially damaging cabinet edges. Additionally, there is a built-in battery-operated sensor C to detect when water is collecting on the surface of the mat. The sensor has an associated speaker D for alerts indicating water presence or low battery. There are on and off buttons F to control the power of the sensor and volume light indicators E.

Figure 2:
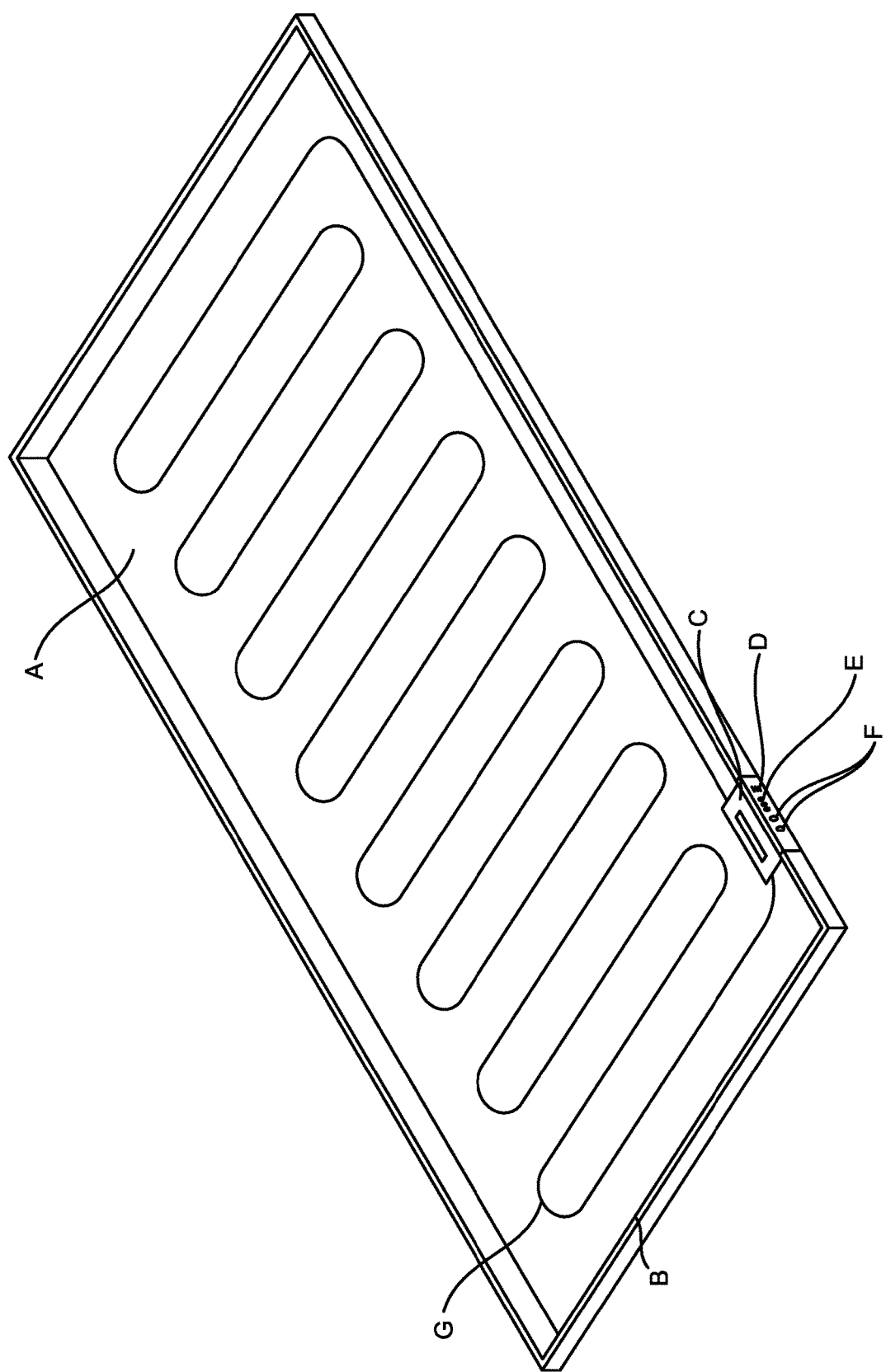
FIG. 2 is a schematic view of the waterproof mat with water detecting resistive wires in accordance with an embodiment of the present disclosure.

FIG. 2 is a schematic view of the waterproof mat with water detecting resistive wires in accordance with an embodiment of the present disclosure. The view includes same and similar reference characters to those in FIG. 1 for same and similar features.

Figure 3:
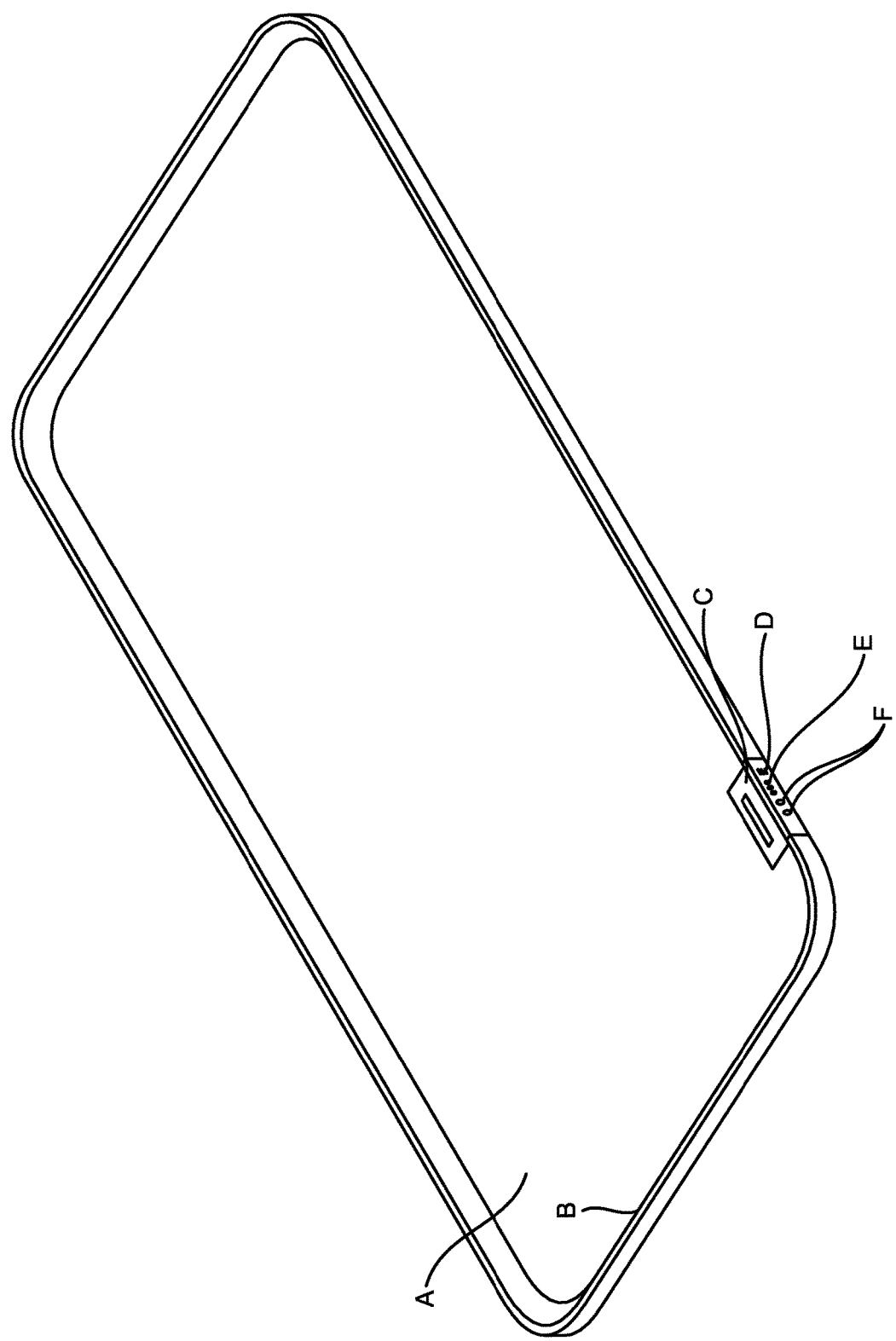
FIG. 3 is a depiction of a circular and oval waterproof mat in accordance with an embodiment of the present disclosure.

FIG. 3 is a depiction of a circular and oval waterproof mat in accordance with an embodiment of the present disclosure. The view includes same and similar reference characters to those in other figures for same and similar features with the addition of the resistive wires G which have a decreased resistance in water. This decrease in resistance is used by the sensor C to detect water on the mat substrate.

Figure 4:
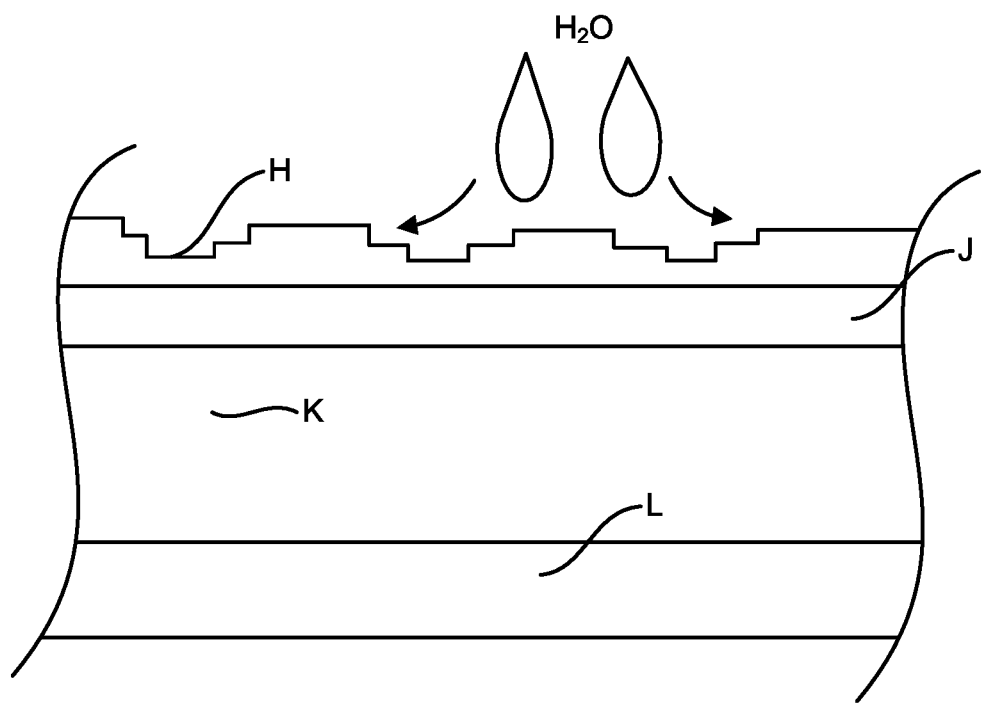
FIG. 4 is a cross section of the layers of the waterproof mat accordance with an embodiment of the present disclosure.

FIG. 4 is a cross section of the layers of the waterproof mat in accordance with an embodiment of the present disclosure. This view includes same and similar reference characters to those in other figures for same and similar features.

This view includes the anti-splash absorbent top layer H, the waterproof layer J, the structural and low durometer layer K and the anti-slip bottom layer L. Layer H is configured to reduce a splash of water leaking from pipes above via an absorbent anti-splash top layer configured to absorb splash from a surface of the mat substrate. The anti-slip layer includes rubber compositions and patterns designed to increase friction between the mat and an underlayment.

Figure 5:
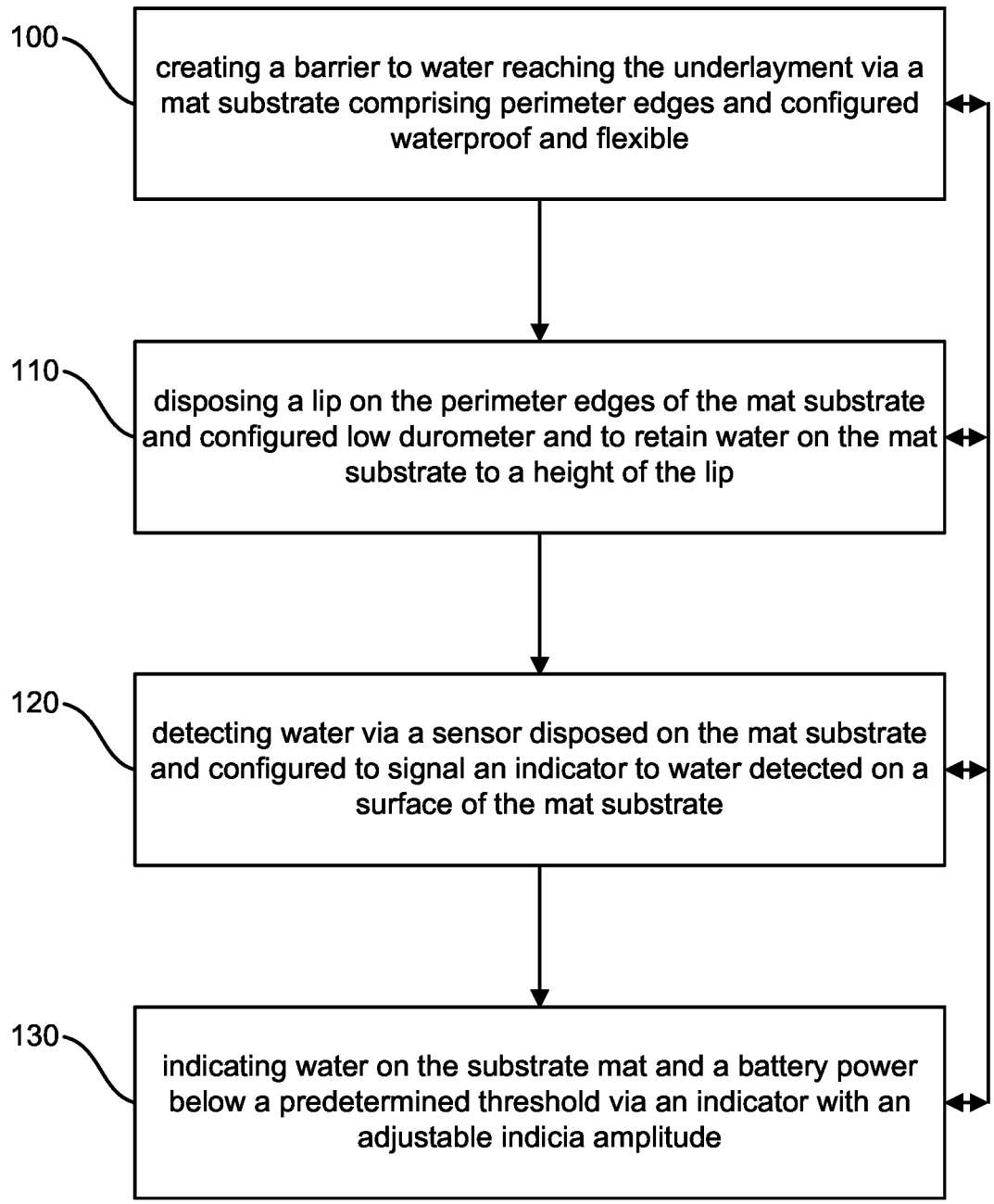
FIG. 5 is a flow chart of a method of protecting a sink cabinet underlayment via the waterproof mat in accordance with an embodiment of the present disclosure.

FIG. 5 is a flow chart of a method of protecting a sink cabinet underlayment via the waterproof mat in accordance with an embodiment of the present disclosure. The disclosed method for protecting 100 an underlayment includes creating a barrier to water reaching the underlayment via a mat substrate comprising perimeter edges and configured waterproof and flexible. The method also includes disposing 110 a lip on the perimeter edges of the mat substrate and configured low durometer and to retain water on the mat substrate to a height of the lip. The method additionally includes detecting 120 water via a sensor disposed on the mat substrate and configured to signal an indicator to water detected on a surface of the mat substrate. The method further includes indicating 130 water on the substrate mat and a battery power below a predetermined threshold via an indicator with an adjustable indicia amplitude.

Figure 6:
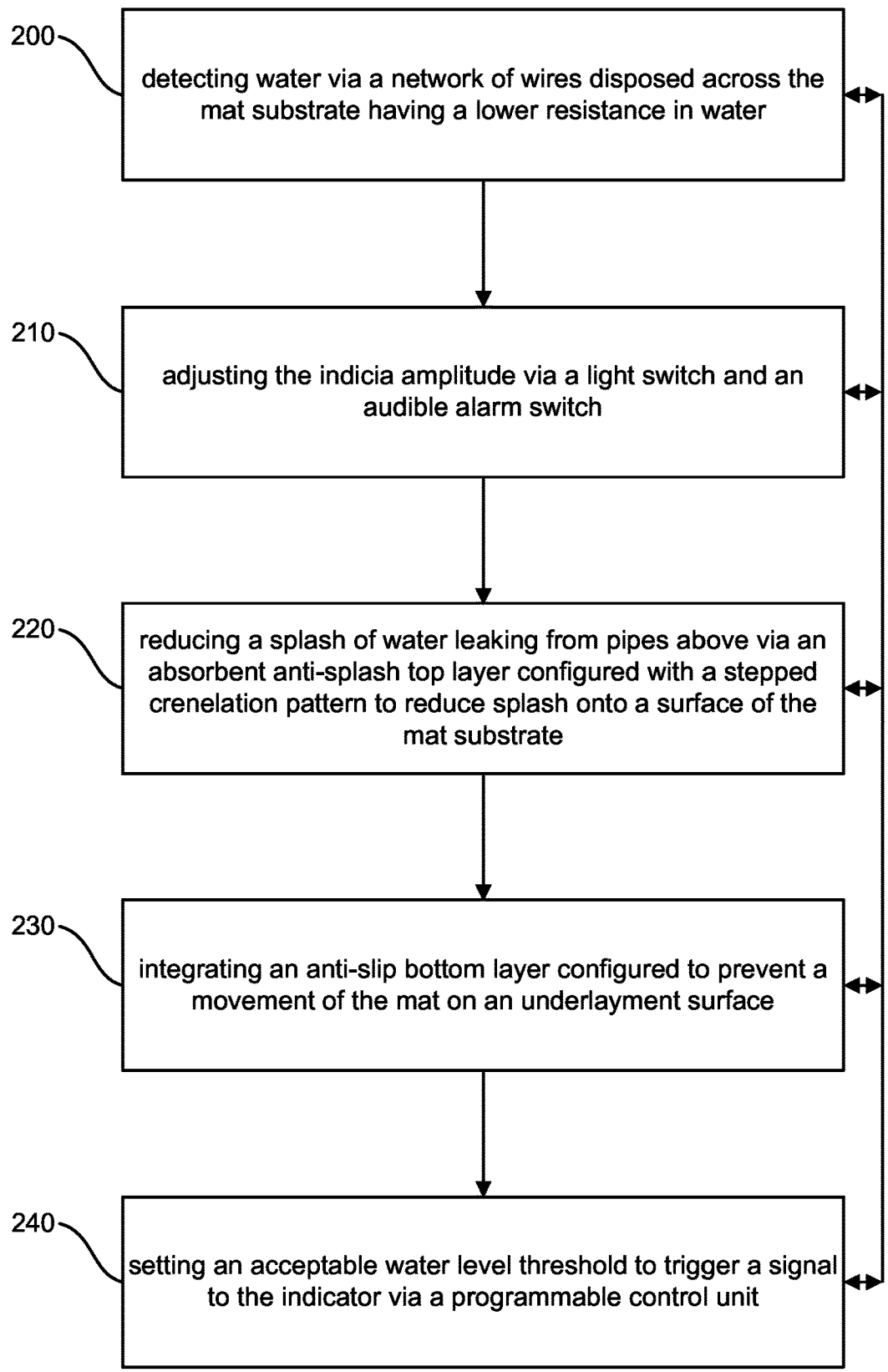
FIG. 6 is a flow chart of additional methods of protecting an underlayment in accordance with an embodiment of the present disclosure.

FIG. 6 is a flow chart of additional methods of protecting a sink cabinet underlayment in accordance with an embodiment of the present disclosure. The additional methods include detecting 200 water via a network of wires disposed across the mat substrate having a lower resistance in water. The additional methods also include adjusting 210 the indicia amplitude via a light switch and an audible alarm switch. The additional methods further include reducing 220 a splash of water leaking from pipes above via an absorbent anti-splash top layer configured with a stepped crenellation pattern to reduce splash onto a surface of the mat substrate. The additional methods yet include integrating 230 an anti-slip bottom layer configured to prevent a movement of the mat on an underlayment surface. The additional methods still include setting 240 an acceptable water level threshold to trigger a signal to the indicator via a programmable control unit.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A mat comprising:
    a mat substrate comprising perimeter edges and configured waterproof and flexible as a barrier to water reaching a surface underlying the mat substrate;
    a lip disposed on the perimeter edges of the mat substrate and configured low durometer and to retain water on the mat substrate to a height of the lip;
    a water detecting sensor disposed on the mat substrate and configured to signal an indicator to water detected on a surface of the mat substrate;
    an indicator comprising an adjustable indicia amplitude indicating water on the substrate mat and a battery power below a predetermined threshold; and
    an absorbent anti-splash top layer configured with a two step nested crenellation pattern to break the fall of water onto a surface of the mat substrate.

2. The mat of claim 1, wherein the perimeter edges comprise 4 rectilinear edges.

3. The mat of claim 1, wherein the perimeter edges comprise one circular and oval edge.

4. The mat of claim 1, wherein the mat substrate comprises a mildew resistant flexible rubber composition.

5. The mat of claim 1, wherein a thickness of the mat substrate includes a water resistant film and a low durometer structural layer.

6. The mat of claim 1, wherein the lip comprises one circular and oval side.

7. The mat of claim 1, wherein the water detecting sensor comprises a network of wires across the mat substrate having a lower resistance in water.

8. The mat of claim 1, wherein the adjustable indicia amplitude is an amplitude adjustable light via a light switch.

9. The mat of claim 1, wherein the adjustable indicia amplitude is an amplitude adjustable audible alarm via a speaker and an alarm switch.

10. The mat of claim 1, further comprising a battery integrated into the mat substrate configured to power the indicator and the adjustable indicia amplitude.

11. The mat of claim 1, further comprising an absorbent anti-splash top layer configured to reduce splash from the mat substrate.

12. The mat of claim 1, further comprising an anti-slip bottom layer configured to prevent a movement of the mat on an underlayment surface.

13. The mat of claim 1, further comprising a programmable control unit configured to accept a water threshold before signaling the indicator.

14. A method for protecting a sink cabinet underlayment, the method comprising:
    creating a barrier to water reaching the underlayment via a mat substrate comprising perimeter edges and configured waterproof and flexible;
    disposing a lip on the perimeter edges of the mat substrate and configured low durometer and to retain water on the mat substrate to a height of the lip;
    detecting water via a sensor disposed on the mat substrate and configured to signal an indicator to water detected on a surface of the mat substrate;
    indicating water on the substrate mat and a battery power below a predetermined threshold via an indicator with an adjustable indicia amplitude; and
    adding an absorbent anti-splash top layer configured with a two step nested crenellation pattern to break the fall of water onto a surface of the mat substrate.

15. The method of claim 14, further comprising detecting water via a network of wires disposed across the mat substrate having a lower resistance in water.

16. The method of claim 14, further comprising adjusting the indicia amplitude via a light switch and an audible alarm switch.

17. The method of claim 14, further comprising integrating an anti-slip bottom layer configured to prevent a movement of the mat on an underlayment surface.

18. The method of claim 14, further comprising setting an acceptable water level threshold to trigger a signal to the indicator via a programmable control unit.

\* \* \* \* \*